(12) United States Patent
Zheng et al.

(10) Patent No.: US 11,911,940 B2
(45) Date of Patent: Feb. 27, 2024

(54) IN-MOLD SPRAYING SYSTEM AND PROCESS METHOD

(71) Applicant: Tederic Machinery Co.,Ltd., Hangzhou (CN)

(72) Inventors: Jianguo Zheng, Hangzhou (CN); Hongwei Zhou, Hangzhou (CN); Jiahui Lu, Hangzhou (CN); Haibo Shen, Hangzhou (CN); Wu Lin, Hangzhou (CN); Binqi Rao, Hangzhou (CN); Hongyuan Ma, Hangzhou (CN); Bo Liu, Hangzhou (CN); Guolin Liu, Hangzhou (CN); Jia Zhou, Hangzhou (CN)

(73) Assignee: Tederic Machinery Co., Ltd., Hangzhou (CN)

( * ) Notice: Subject to any disclaimer, the term of this patent is extended or adjusted under 35 U.S.C. 154(b) by 0 days.

(21) Appl. No.: 17/959,192

(22) Filed: Oct. 3, 2022

(65) Prior Publication Data
US 2023/0302696 A1 Sep. 28, 2023

(30) Foreign Application Priority Data

Feb. 8, 2022 (CN) .......................... 202210117149.2

(51) Int. Cl.
*B29C 45/16* (2006.01)
*B29C 45/37* (2006.01)
(Continued)

(52) U.S. Cl.
CPC ...... *B29C 45/1679* (2013.01); *B29C 45/1603* (2013.01); *B29C 45/2602* (2013.01);
(Continued)

(58) Field of Classification Search
CPC .. B29C 45/1603–1607; B29C 45/1679; B29C 2045/202; B29C 2045/2761;
(Continued)

(56) References Cited

U.S. PATENT DOCUMENTS

2018/0099438 A1* 4/2018 Chen ...................... B29C 45/32

FOREIGN PATENT DOCUMENTS

| CN | 101405120 A | | 4/2009 |
| CN | 101422951 A | * | 5/2009 |

(Continued)

*Primary Examiner* — Seyed Masoud Malekzadeh
*Assistant Examiner* — Vipul Malik
(74) *Attorney, Agent, or Firm* — Kunzler Bean & Adamson; Scott D. Thorpe (57) ABSTRACT

For in mold spraying, a double-inclined mixing nozzle is connected obliquely and fixedly with a side surface of a third half-mold through a lateral sealing structure and connected with a side surface of a first half-mold in an inclined and sealing manner, side faces of a first half-mold and the third half-mold are respectively provided with installation inclined surfaces. A lateral sealing structure includes a mounting plate and a sealing member. The sealing member is sleeved on the double-inclined mixing nozzle and is in transition fit with the double-inclined mixing nozzle and the mounting plate respectively. A butt sealing groove provided on the installation inclined surface of the first half-mold and is in sealing fit with the mounting plate.

7 Claims, 8 Drawing Sheets

(51) Int. Cl.
| | |
|---|---|
| *B29C 45/64* | (2006.01) |
| *B29C 45/26* | (2006.01) |
| *B29K 75/00* | (2006.01) |
| *B29C 45/76* | (2006.01) |
| *B29C 45/78* | (2006.01) |
| *B29C 45/80* | (2006.01) |
| *B29K 55/02* | (2006.01) |
| *B29K 69/00* | (2006.01) |

(52) U.S. Cl.
CPC ............ *B29C 45/37* (2013.01); *B29C 45/641* (2013.01); *B29C 45/7653* (2013.01); *B29C 45/78* (2013.01); *B29C 45/80* (2013.01); *B29C 2945/76498* (2013.01); *B29C 2945/76535* (2013.01); *B29C 2945/76702* (2013.01); *B29C 2945/76735* (2013.01); *B29K 2055/02* (2013.01); *B29K 2069/00* (2013.01); *B29K 2075/00* (2013.01)

(58) Field of Classification Search
CPC .... B29C 2045/2719; B29C 2045/2759; B29C 45/2602; B29C 45/2606
USPC .................................................. 425/569, 571
See application file for complete search history.

(56) References Cited

FOREIGN PATENT DOCUMENTS

| | | |
|---|---|---|
| CN | 106985331 A | 7/2017 |
| CN | 108136692 A | 6/2018 |
| CN | 110978387 A | 4/2020 |
| CN | 112590091 A | 4/2021 |
| CN | 114147915 A | 3/2022 |
| EP | 3838548 A1 * | 6/2021 ....... B29C 45/14065 |

* cited by examiner

IN-MOLD SPRAYING SYSTEM AND PROCESS METHOD

CROSS-REFERENCE TO RELATED APPLICATIONS

This application claims priority to Chinese State Intellectual Patent Application Number 202210117149.2 entitled "IN-MOLD SPRAYING SYSTEM AND PROCESS METHOD" and filed on Feb. 8, 2022, for TEDERIC MACHINERY CO., LTD, the entire contents of which are incorporated by reference for all purposes.

FIELD

The present invention relates to the technical field of injection molding, especially a kind of in-mold spraying system and processing method.

BACKGROUND

Description of the Related Art

Automotive interior has put forward higher requirements to color, touch, intelligence, and polyurethane (hereinafter referred to as PU) as a kind of "intelligent" material, with its soft and hard, wear-resistant, scratch-resistant, Features such as self-healing, as well as the advantages of free color matching, bright colors, and friendliness to "smart inserts", are used in the preparation of interior components such as instrument panels, center consoles, door panels, and smart home appliances, and the demand for PU is increasing year by year.

The existing conventional processing method is to inject the semi-finished plastic parts first, and then transfer the semi-finished plastic parts to other stations for processing the surface PU layer. It is more complicated in a long production cycle.

Different improved techniques have also emerged for the spraying of PU coatings, such as: (1) Chinese patent application documents, the patent document with the application number CN201911320050.7 discloses a multi-material injection molding machine and a multi-material injection molding method thereof, providing a moving module and a fixed module, the fixed module includes conventional Injection fixed mold base and PU fixed mold base, movable module includes conventional injection movable mold base and PU fixed mold base, First, the conventional plastic part a is injected in the first mold closing, the first mold opening moves the plastic part a to the PU fixed mold seat, and the second mold closing is performed to inject the PU layer of the plastic part a, and the conventional plastic part b is injected. The second mold opening moves b to the PU fixed mold seat, the third mold closing to obtain the plastic part a', and the third mold opening to take out a'. However, in the above technical solution, the moving process of the plastic parts between the fixed mold bases is operated by a manipulator, and the position of the plastic parts is changed. It also depends on the fixture for clamping, the process is more complicated and the efficiency is low.

In the above technical solution, in the process of applying PU coating to the plastic parts, the position of the plastic parts needs to be changed from the original fixed mold to another fixed mold. There is a mold changing process in the middle, and a fixture needs to be set on the mold, the operation and equipment are more complicated. (2) Chinese patent application documents, the patent document with the application number CN201680058012.7, discloses an injection molding machine with a coating device, which mainly solves the realization of the significantly improved metering performance of the RIM (reaction injection) coating device. The specific scheme is A first pressure generating mechanism (raw material supply) is placed on or around the injection molding machine, and a second pressure generating mechanism moves with the mold clamping plate. However, this technical solution requires two different pressure generating mechanisms to be connected to the mixing head, and the mixing nozzle is connected to the template.

In the above technical solution, in order to improve the quality of the injection molded part, the coating device is divided into a high-pressure part and a low-pressure part, and the high-pressure part is mechanically connected with the clamping plate of the mold. It is mentioned in the technical background that the high-pressure pump is much larger and heavier than the low-pressure feed pump of the coating device, is arranged with the injection molding machine, is constructed to be compact and highly integrated and is placed on a base plate, will affect the final coating quality. (3) Chinese patent application documents, the patent document with the application number CN200780009696.2, discloses a method for manufacturing coated composite parts, mainly a method for manufacturing PU coated plastic parts to solve the problem of exhaust holes restrictive. A specific solution, however, is to laminate or emboss an unreacted hardened polyurethane layer onto a thermoplastic substrate to form a coated composite component. (4) Chinese patent application documents, the patent document with the application number CN202011380788.5 discloses a lightweight production process and production equipment for automotive trim based on LFI technology. The main processes are: 1. In-mold spray paint→2. Primer on the paint→3. Mixing and pouring→4. Clamping and curing→5. Demolding→6. Trimming→7. Packaging; some process parameters are included. The device is mainly equipped with nozzles on the manipulator, and adopts up and down movement and horizontal movement for mold clamping and picking, and the device is more differentiated. (5) Chinese patent application documents, the patent document with the application number CN201710368259.5, discloses an in-mold vacuum spraying device, and the rotating template provides the first fixed mold and the second fixed mold and the movable mold are respectively closed to form two molds. After injection molding the raw material injection mold cavity, the surface is sprayed on the inside of the PU injection mold cavity, and an automatic drying device and a paint separation system are also provided to cooperate with the spraying.

BRIEF DESCRIPTION OF THE DRAWING

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

The purpose of the present invention is to address the existing technical solutions: first, the process and equipment are cumbersome and problematic; second, the coating device and the injection molding machine are too compact in structure and the measurement accuracy and quality problems caused by configuration problems; third, the existing In the technology, the surface coating of the plastic parts needs to be replaced by the station, and the semi-finished products of the plastic parts are transferred to another set of equipment for spraying. The reverse thrust leads to unstable jet flow, which makes the quality of products unstable and other problems. Provide an in-mold spraying system and process method with high stability and consistency of spraying, simple equipment and process, convenient operation, and high PU layer surface quality.

The technical scheme adopted by the present invention to achieve the purpose of the invention is: an in-mold spraying system, including an injection machine, a PU injection device and a temperature control unit, the injection machine includes a hopper, injection parts, a front template, a movable template and a clamping mechanism, The front template is provided with a first half-mold, The movable template is provided with a second half-mold and a third half-mold, the second half-mold and the third half-mold are respectively clamped with the first half-mold to form a base material injection mold cavity and a PU injection mold cavity, the side of the third half-mold is installed with a double inclined mixing nozzle connected to the PU injection device. the external part of the double-inclined mixing nozzle is connected with the side of the third half-mold in an inclined and sealed connection and is connected with the side of the first half-mold in an inclined and sealed manner during the clamping process, the internal injection axis of the double-inclined mixing nozzle is arranged obliquely with the axis where the injection flow channel inside the PU injection mold cavity is located. The in-mold spraying system forms two mold cavities through three half-molds, injects in two times, and injects the substrate into the substrate injection mold cavity to form the substrate, and in the PU injection mold cavity can form a PU coating with high surface quality product. There is no need to place the injection-molded products in another set of equipment for surface spraying processing, and two working steps can be realized in one station, which improves the production efficiency. The pressure of the PU injection device is used to provide the injection pressure of the PU material, and there is no need to add an additional low-pressure part, which saves the cost of the equipment and reduces the impact of the complexity of the equipment on the quality of the product. A pair of inclined mixing nozzles is installed obliquely on the side of the third half-mold, and the outside of the double-inclined mixing nozzle is connected to the side of the third half-mold in an oblique and sealing manner and is connected to the side of the first half-mold in an oblique and sealing manner during the mold clamping process. The internal injection axis of the double-inclined mixing nozzle is arranged obliquely with the axis where the injection flow channel inside the PU injection mold cavity is located. This design structure can cleverly use the mold clamping action of the injection machine to achieve the locking of the lateral sealing structure, effectively reducing the influence of the jet instability phenomenon caused by the high-pressure reverse thrust of the double-inclined mixing nozzle during the injection stage, making the fluid flow It can fill the cavity more smoothly and keep the state of the jet in a relatively stable range, thereby further improving the quality stability and consistency of the product.

The double-inclined mixing nozzle may be connected obliquely and fixedly with the side surface of the third half-mold through a lateral sealing structure, and is connected with the side surface of the first half-mold in an inclined and sealing manner; the sides of the first half-mold and the third half-mold are respectively provided with installation inclined surfaces, the lateral sealing structure includes a mounting plate and a seal, the mounting plate is fixed on the mounting inclined surface and extends to one side of the inner plane of the cavity of the third half-mold, the mounting plate and the inner plane of the mold cavity of the third half mold form a side inclined angle of 95°~120°, the seal is sleeved on the double-inclined mixing nozzle and is in transition fit with the double-inclined mixing nozzle and the mounting plate, respectively. the installation inclined surface of the first half-mold is provided with a butt sealing groove, the butt sealing groove is in sealing engagement with the mounting plate, the lateral sealing structure is achieved by arranging a seal on the double-inclined mixing nozzle, preferably a Teflon ring, to solve the sealing between the double-inclined mixing nozzle and the mounting plate. The sealing element is in transition fit with the mounting plate, the mounting plate is fixed and installed on the third half-mold by screws, and the contact surface of the mounting plate and the third half-mold is closely fitted, the plane of the mounting plate and the inner plane of the mold cavity of the third half-mold form a side inclination of 95° to 120°, the dual-inclined mixing nozzles and seals and mounting plates are transition fits to prevent leakage during PU material injection. In order to ensure the sealing performance after the mold is closed, a butt sealing groove is set on the inclined installation surface of the first half-mold. When the mold is closed, the mounting plate is completely embedded into the butt sealing groove to achieve transition fit sealing at the joint, and at the same time, the injection flow channel formed after the mold is closed is sealed through the seal. The double-inclined mixing nozzle is directly fixed on the side of the third half-mold, and the unique lateral sealing structure can be used skillfully to use the mold clamping action of the injection machine to lock the sealing structure and reduce the double-inclined mixing. The reverse thrust caused by the high pressure of the nozzle during the injection stage reduces the influence of the reverse thrust to a very low level, and the influence of the jet instability caused by the reverse thrust is also correspondingly reduced, so that the fluid can fill the cavity more smoothly. The state is maintained within a relatively stable range, thereby further improving the quality stability and consistency of the product.

The injection inclination angle between the internal injection axis of the double-inclined mixing nozzle and the axis where the injection flow channel inside the PU injection mold cavity is located may be set to be 5°~30°; the double-inclined mixing nozzle is provided with a nozzle, and the injection inclination angle is formed between the injection axis of the nozzle and the inner plane of the third half-mold used for clamping to form the PU injection mold cavity; the nozzle is a variable-angle vortex collision nozzle. The angle between the injection axis of the nozzle and the inner plane of the third half-mold used for clamping to form the PU injection mold cavity is 5°~30°. The direction of injection and the injection flow channel inside the PU injection mold cavity are set in an inclined structure, which effectively reduces the reverse thrust during injection, so as to stabilize the jet injected by the PU, so that the fluid can fill the cavity more smoothly, so that the state of the jet is maintained within a relatively stable range, improve quality stability and consistency. In order to further maintain the jet stability of the fluid, a new design of the nozzle is carried out. The nozzle is designed as a variable-angle nozzle that can change the angle with the fluid spray. At the same time, the nozzle is arranged in a vortex collision structure.

A mixing flow channel and a component flow channel are arranged inside the double-inclined mixing nozzle, and the component flow channel may be a staggered axis collision structure and communicates with the mixing flow channel, each component flow channel forms an independent circulation system with the inside of the PU injection device; the component flow channel includes a first component flow channel and a second component flow channel, the first component flow channel and the second component flow channel are respectively provided with injection chambers, the axis of the injection cavity of the first component flow channel and the axis of the injection cavity of the second component flow channel are arranged at a cross of 120° to 150°, the intersection point of the axes of the two injection chambers is arranged on the axis of the mixing flow channel to form a staggered axis collision structure. A new design is made for the double-inclined mixing nozzle. The mixing flow channel is set inside the double-inclined mixing nozzle. The component flow channel connected with the mixing flow channel, the component flow channels are arranged in a staggered axis collision structure. The middle is set as a mixing flow channel, and the two sides are component flow channels. The component flow channels are respectively set opposite to each other and are not on the same axis. This structure makes the separation value of the two components liquid inside the component flow channel on both sides the smallest, which can effectively reduce the stringing situation. A second impact on the chamber also dissipates a vortex, helping to maximize mixing. The two-component raw materials in the two-component flow channel enter the double-inclined mixing nozzle from different pipelines respectively, forming an independent flow path circulation inside, and return to the PU injection device from different pipelines respectively. The independent circulation system makes them not mixed with each other before spraying, and each circulates independently, avoiding the occurrence of the phenomenon of bunching.

The first component flow channel and the second component flow channel may be respectively provided with raw material pistons, and the double-inclined mixing nozzle is provided with a first component inlet that communicates with the first component flow channel and forms an independent circulation system and the first component exports, the first component inlet and the first component outlet are respectively connected to the PU injection device; the double inclined mixing nozzle is provided with the second component inlet and the second component outlet which communicate with the second component flow channel and form an independent circulation system, the second component inlet and the second component outlet are respectively connected to the PU injection device. The first component flow channel and the second component flow channel are respectively provided with raw material pistons. The purpose is that when PU injection is not performed, the raw material piston blocks the component flow channels so that each component flows independently of each other. Take the first component as an example, enter the first component flow channel from the first component inlet, and flow back to the PU injection device from the first component outlet to form an independent cycle; when the raw material piston is opened, the raw materials of the two components are injected into the mixing channel to start the mixing reaction.

The PU injection device may include a first component PU injection device and a second component PU injection device, and the first component PU injection device and the second component PU injection device respectively include a pressure pump, a material tank, a flow meter, a heat Fan, electric control cabinet and insulation box, the material tank is disassembled and arranged above the inner part of the insulation box, the pressure pump is arranged inside the insulation box and communicated with the material tank through a pipeline, and the flow meter is arranged on one side of the insulation box And connected with the material tank through the pipeline, the hot air blower is arranged under one side outside the insulation box, and the circulating hot air is continuously fed into the insulation box. The electric control cabinet is arranged on one side of the insulation box to control the pressure of the pressure pump and set the flow rate of the flow meter. For different components of raw materials and PU injection device, each component of PU injection device includes pressure pump, material tank, flow meter, hot air blower, electric control cabinet and insulation box. The material tank is mechanically disassembled. Set above the interior of the insulation box, the material tank can be disassembled and replaced, no additional material tank is required for color change injection, air-cooled heating is used to control the temperature of the PU raw material, and the water circulation system and the corresponding pipe network and water pump are omitted, more environmentally friendly and saves water resources, reliable operation, easy to use, and extremely low maintenance costs.

The first half-mold may be provided with a thimble, and the third half-mold is provided with a PU flow channel and an exhaust neutron exhaust; the mold temperature control unit controls the mold temperature of the first half-mold, the second half-mold and the third half-mold to be 60° C. to 85° C. The thimble is set on the first half of the mold to facilitate the ejection and demolding of the workpiece coated with the PU layer; the process parameters are improved, the mold temperature is controlled, and the influence of the temperature on the PU material is further controlled. Set it in the range of 60° C.~85° C., so that the PU material will not react and solidify rapidly after entering the mold cavity, which will affect the subsequent injection process.

A fixed plate may be arranged on the movable platen, a sliding groove is arranged at the bottom of the fixed plate, a sliding guide is arranged inside the sliding groove, the sliding guide is fixedly installed on a mold mounting plate, and the second half-mold and the third half-mold are fixed on mold mounting plate; a mold oil cylinder is arranged above the fixed plate, the piston rod of the mold oil cylinder is connected with a moving plate, and the moving plate is fixedly connected with the mold mounting plate and drives the mold mounting plate to slide along the sliding groove. The second half-mold and the third half-mold are fixedly mounted on the mold mounting plate, the mold mounting plate is provided with sliding guide rails, and the sliding guide rails can slide in the sliding grooves provided at the bottom of the corresponding fixing plate. The mold cylinder is fixed on the fixed plate, the piston rod of the cylinder is fixedly connected to the moving plate, the moving plate is fixedly connected to the mold mounting plate, and the fixed plate is fixedly installed on the moving template. The three mold halves move along with the mold mounting plate to be respectively clamped with the first mold half to form a base material injection mold cavity and a PU injection mold cavity.

Two mold cavities are formed by three half-molds, and two injections are used to form PU coated products with high surface quality. Two working steps can be realized in one station, which greatly improves the production efficiency.

The technical scheme adopted by the present invention to realize the second purpose of the invention is: a process method for spraying with an in-mold spraying system, comprising the following steps:

Step 1: Preparation for equipment startup: the injection machine and PU injection device are turned on, the mold temperature control unit heats the first half-mold, the second half-mold and the third half-mold to 60° C.~85° C., and the PU injection device heats the raw materials in the tank to 60~85° C., at the same time, each component of the PU material starts to circulate independently in the component flow channel in the double-inclined mixing nozzle;

Step 2: The first mold clamping: the first half-mold and the second half mold are closed to form a base material injection mold cavity, the injection machine injects polycarbonate (PC) or acrylonitrile butadiene styrene (ABS) into the base material injection mold cavity, and the injection molding is kept under pressure and cooled to obtain the base material;

Step 3: The first mold opening: the first half mold and the second half mold are opened, the base material is fixed on the first half mold, the mold cylinder starts to work, the second half mold is moved away from the first half mold, the third half-mold moves close to the first half-mold to reach the position corresponding to the clamping of the first half-mold;

Step 4: The second mold clamping: the first half mold and the third half mold are closed to form a PU injection mold cavity, the mold clamping mechanism provides a clamping force of 1500-2500 kN, and the double inclined mixing nozzle on the side of the third mold half. The side of the first half mold is tightly fitted to complete the sealing, and the exhaust neutron inside the third half mold is opened;

Step 5: PU layer spraying: After the exhaust neutron is turned on for at least 5 seconds, all the component flow channels are opened, and the PU raw materials enter the mixing flow channel from the component flow channel and are mixed inside the mixing flow channel, inject into the PU injection mold cavity under the pressure of the PU injection device;

Step 6: maintaining pressure and cooling for demolding: maintaining pressure and cooling for 70~90 seconds, the ejector pin of the first half-mold pushes the workpiece with PU coating out of the mold to obtain a plastic product with PU layer.

In step 5, the first component flow channel injects the POLY raw material into the mixing flow channel according to the preset flow rate and pressure, the preset flow rate and pressure in the second component flow channel inject ISO raw materials into the mixing flow channel, the two raw materials are mixed in the mixing channel to form PU material, and the two raw materials, POLY and ISO, are mixed under the pressure of the pressure pump and injected into the PU injection mold cavity through the PU channel, a PU layer is formed on the substrate.

In this process, three half-molds are used to form two mold cavities, and two injections are performed to form PU coated products with high surface quality. Two working steps are realized in one station, and the production efficiency is high, and the pressure pump of the PU injection device directly provides the injection force of the PU material, which saves the equipment cost and reduces the impact of the complicated equipment procedure on the quality of the product. Because the double-inclined mixing nozzle is arranged on the side of the third half-mold and has a lateral sealing structure, the clamping action of the injection machine can be used to realize the locking of the sealing structure and reduce the occurrence of jet instability caused by reverse thrust, so that the fluid can fill the cavity more smoothly and maintain the state of the jet in a relatively stable range, thereby improving the quality stability and continuity of the product, and effectively controlling the mold temperature, so that the PU material does not enter the cavity after entering the mold. It will react quickly and fix, improving the surface quality of the PU layer. The technological method has the advantages of convenient operation and reliable operation.

The beneficial effects of the present invention are as follows: (1) Two mold cavities are formed by three half-molds, and two injections are made respectively to form PU coated products with high surface quality, which improves the production efficiency; (2) A new design is made for the double-inclined mixing nozzle. The mixing flow channel is set inside the double-inclined mixing nozzle, and the component flow channel is connected with the mixing flow channel. The component flow channel is arranged in a staggered axis collision structure. The mixing flow channel is set in the middle, and the component flow channels are set on both sides. The component flow channels are respectively set opposite to each other, and are not on the same axis. The axes of the two component flow channels are set crosswise. The separation value of the two components of the liquid is the smallest, which can effectively reduce the string of materials. After the impact, the mixed components of the two will generate a second impact on the arc wall chamber of the mixing channel, and at the same time, the vortex will be dispersed, which is beneficial to maximize the mixing effect; (3) The pressure pump of the PU injection device is used to provide the injection pressure of the PU material. There is no need to add an additional low-pressure part. The pressure pump provides the injection pressure. Injection molding in the cavity saves equipment costs and reduces the impact of equipment complexity on product quality; (4) The double-inclined mixing nozzle is directly fixed on the side of the third half mold, and the unique lateral sealing structure is adopted, which can skillfully use the mold closing action of the injection machine to realize the locking of the sealing structure and avoid the unstable jet flow Influence on PU layer spraying. This allows the fluid to fill the cavity more smoothly and maintains the state of the jet within a relatively stable range, thereby further improving the quality stability and consistency of the product; (5) The material tank of the PU injection device can be directly replaced, and the current colorless masterbatch tank can be replaced with a mixed material tank containing mixed components and color masterbatch, and it can be restarted without replacing the double-inclined mixing nozzle. Production is carried out to achieve high-efficiency production; (6) In this scheme, the PU injection device adopts air-cooled heating, which effectively reduces the annual comprehensive cost of PU equipment, saves the expenditure on the water circulation system and the corresponding pipe network and water pump, is more environmentally friendly and saves water resources, operates reliably, and maintenance costs are extremely low; (7) In this technical scheme, the process parameters are also improved, the mold temperature is controlled, and the influence of temperature on the PU material is further controlled. The mold temperature is set in the range of 60-85° C., so that the PU material enters the mold cavity. It will not react and solidify rapidly after the injection, which will affect the subsequent injection process. At the same time, the clamping force is adjusted and the surface quality of the PU layer is improved.

FIGS. 1-10 show a Hopper 2, Injection part 3, Front template 4, Thimble 41, Butt sealing groove 42, Mixing nozzle 50, injection cavity 51, first component flow channel 52, mixing flow channel 53, second component flow channel 54, first component outlet 55, first component inlet 56, second component outlet; 57, second component inlet 58, raw material piston 59, nozzle 591, rotary head 592, connecting body 593, independent nozzle 6, second half mold 7, third half-mold 7, exhaust neutron 71, PU runner, 73, installation slope of the third half-mold 7, PU injection device 81, pressure pump 82, material tank 83, flow meter 84, hot air blower 85, electric control cabinet 86, thermal insulation box 9, mold temperature control unit 10, moving template 11, mold clamping mechanism; 15, mounting plate 16, seals, guide rail 19, sliding groove 20, fixed plate 21, moving plate 23, mold mounting plate 24, base material 25, cavity, α side inclination angle, and β injection inclination angle 101.

Various aspects of the present invention will be described in detail below through specific embodiments and in conjunction with the accompanying drawings.

Figure 1:
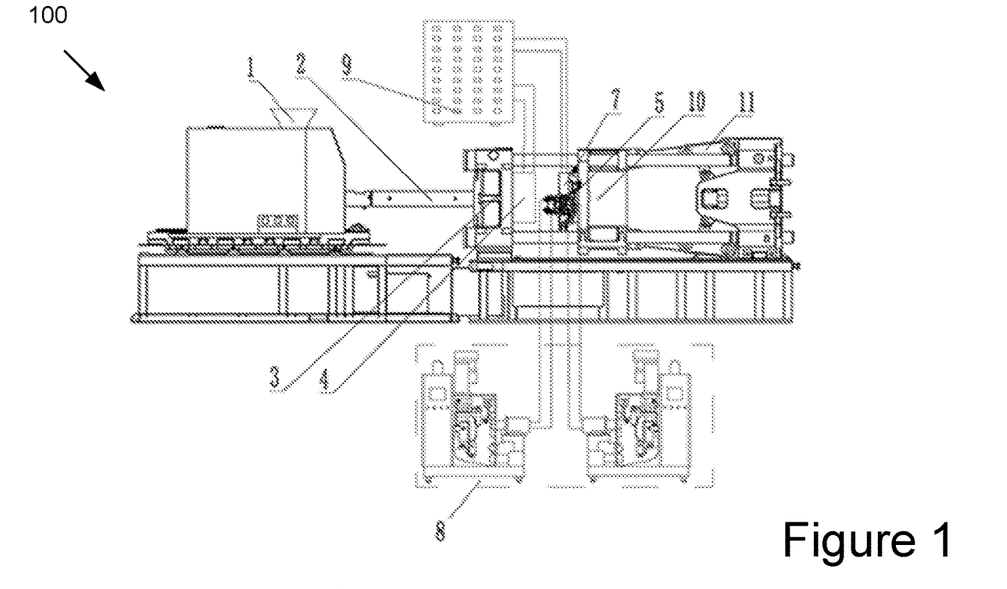
FIG. 1 is a structural representation of in-mold spraying system of the present invention.
Figure 7:
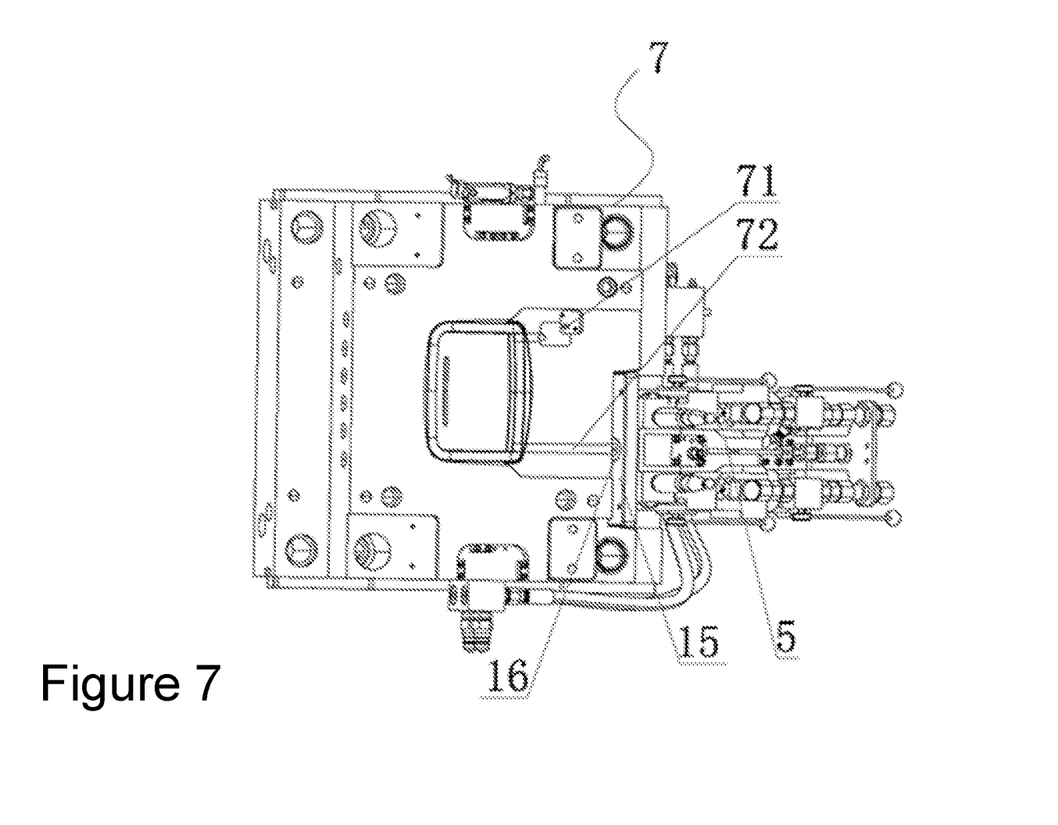
FIG. 7 is a schematic view of the structure of the second view of the connection between the double-inclined mixing nozzle and the third half-mold in the present invention.

In the embodiment shown in FIG. 1, an in-mold spraying system, the whole system mainly includes an injection machine 100, three half-molds 4/7, a mold temperature control unit 9, a PU injection device 8 and a double-inclined mixing nozzle 5. The injection machine 100 includes a hopper 1, an injection part 2, a front die plate 3, a movable die plate 10 and a clamping mechanism 11. The mold temperature control unit 9 controls the temperature of the three half-molds to prevent the PU material from rapidly solidifying during the injection process. The three half-molds are the first half-mold 4, the second half-mold 6 and the third half-mold 7, respectively. A first half-mold 4 is set on the front template 3, a second half-mold 6 and a third half-mold 7 are arranged on the movable platen 10. the first half-mold 4 is provided with a thimble 41, and the first half-mold is provided with a thimble 41 to facilitate the ejection and demolding of the workpiece coated with the PU layer; As shown in FIG. 7, the third half mold 7 is provided with a PU flow channel 72 and an exhaust neutron 71; The mold temperature control unit 9 controls the mold temperatures of the first half mold 4, the second half mold 6 and the third half mold 7 to be 60° C. to 85° C. The process parameters are improved, the mold temperature is controlled, and the effect of temperature on the PU material is further controlled. The mold temperature is set in the range of 60° C.~85° C., so that the PU material will not react and solidify rapidly after entering the mold cavity.

Figure 8:
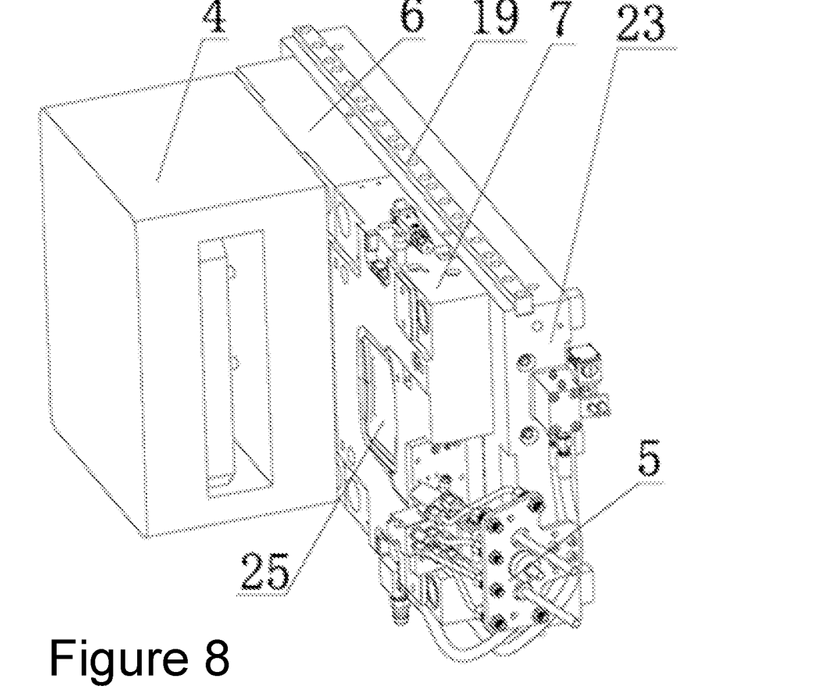
FIG. 8 is a structural representation of the clamping state of the first half-mold and the second half-mold in the present invention.
Figure 9:
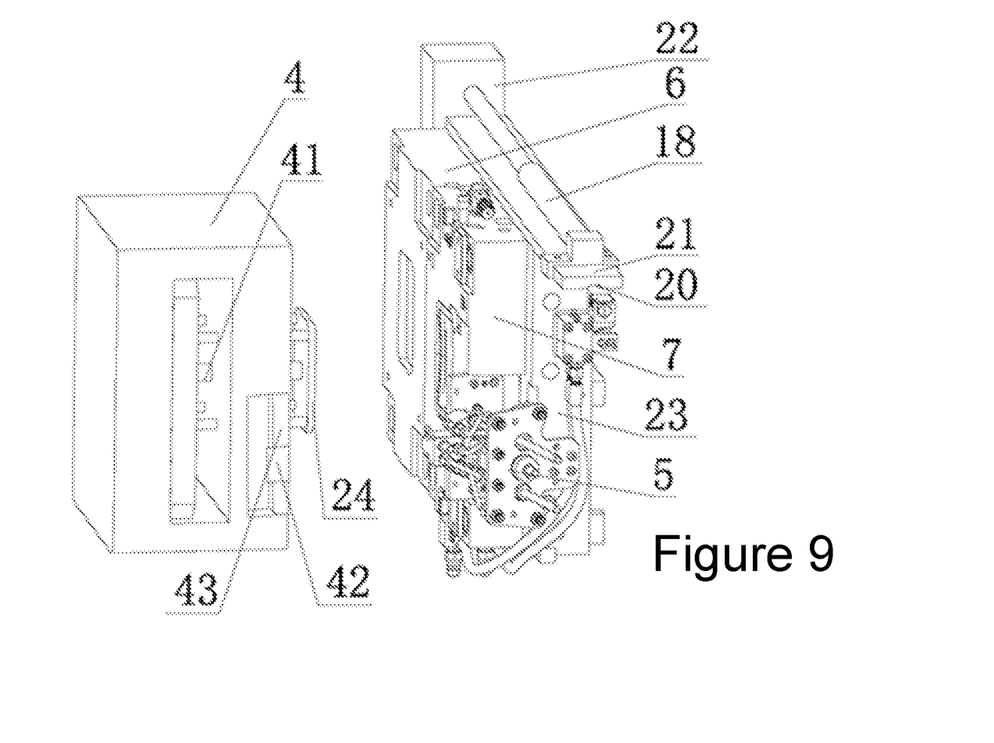
FIG. 9 is a structural schematic diagram of the mold opening state of the first half-mold and the second half-mold in the present invention.
Figure 10:
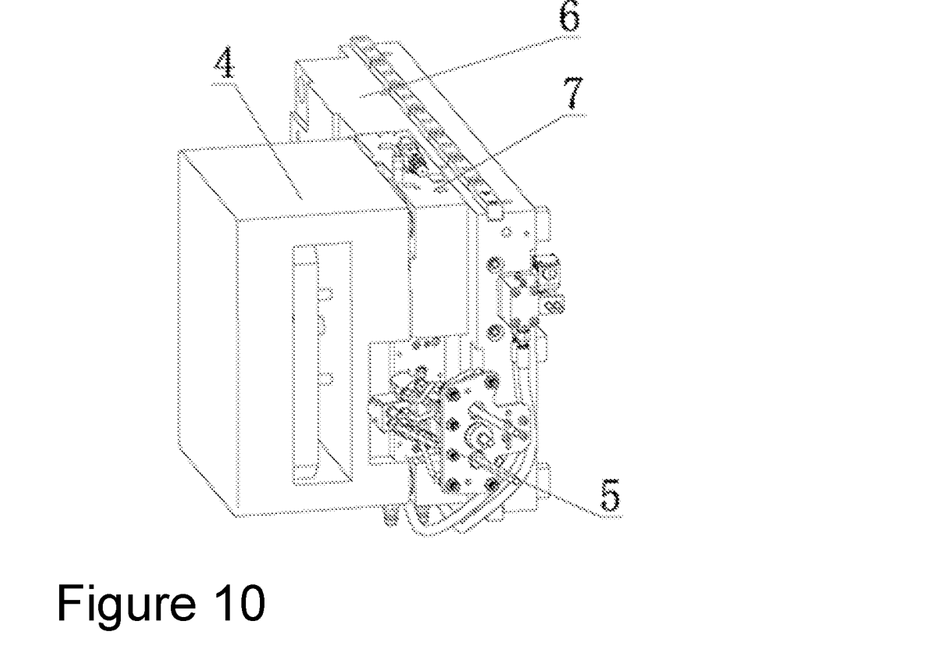
FIG. 10 is a structural schematic diagram of the clamping state of the first half-mold and the third half-mold in the present invention.

As shown in FIG. 9, a fixed plate 21 is arranged on the movable die plate 10, a sliding groove 20 is arranged at the bottom of the fixed plate 21, a sliding guide 19 is arranged inside the sliding groove 20, and the sliding guide 19 is fixedly installed on a mold mounting plate 23, The second half mold 6 and the third half mold 7 are fixed on the mold mounting plate 23; a mold cylinder 18 is arranged above the fixed plate 21, and a piston rod of the mold cylinder 18 is connected to a moving plate 22, and the moving plate 22 is fixedly connected to the mold mounting plate 23 and drives the mold mounting plate 23 to slide along the sliding groove 20. As shown in FIGS. 8 and 10, when the mold cylinder 18 controls the movement of the moving plate, the moving plate drives the mold mounting plate to move, and the second half mold 6 and the third half mold 7 move with the mold mounting plate 23, Half mold 4 mold closing. The second half mold 6 and the third half mold 7 are respectively clamped with the first half mold 4 to form a base material injection mold cavity and a PU injection mold cavity. The second half-mold and the third half-mold are fixedly mounted on the mold mounting plate, and the mold mounting plate is provided with sliding guide rails, which can slide in the sliding grooves provided at the bottom of the corresponding fixed plate, and the mold is fixed on the fixed plate The oil cylinder, the piston rod of the oil cylinder is fixedly connected to the moving plate, the moving plate is fixedly connected to the mold mounting plate, and the fixed plate is fixedly installed on the moving platen. When the mold cylinder controls the movement, the second half mold and the third half mold are installed with the mold. The plate is moved to mold with the first half mold respectively to form a base material injection mold cavity and a PU injection mold cavity. Two mold cavities are formed by three half-molds, and two injections are used to form PU coated products with high surface quality. Two working steps can be realized in one station, which greatly improves the production efficiency.

Figure 4:
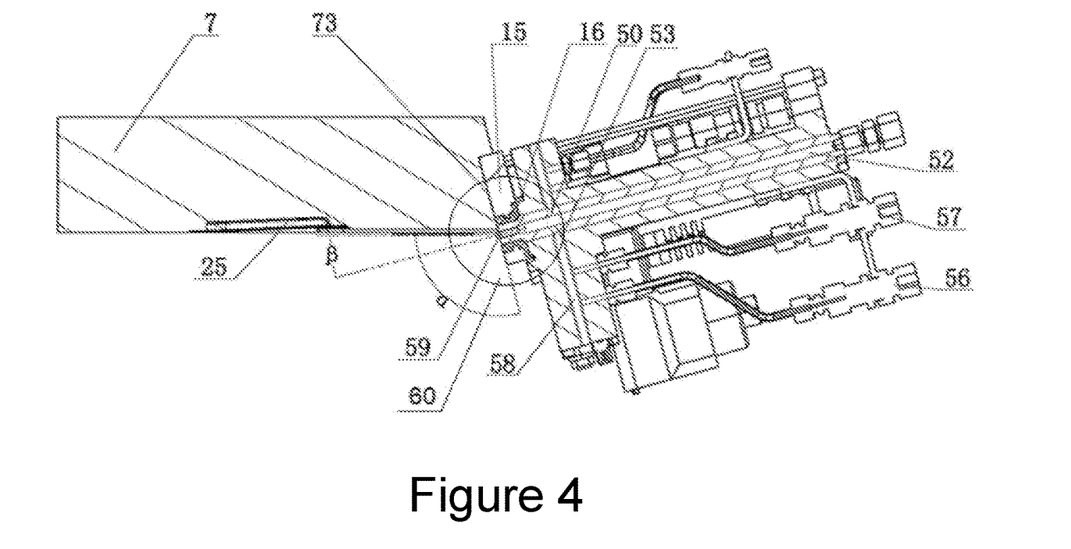
FIG. 4 is a cross-sectional view of the connection between the double-inclined mixing nozzle and the third half-mold in the present invention.

As shown in FIGS. 4 and 8, the side of the third half-mold 7 is installed with a double-inclined mixing nozzle 5 connected to the PU injection device 8, and the outside of the double-inclined mixing nozzle 5 is connected to the side of the third half-mold in an oblique and sealing manner and is closed. During the molding process, it is connected to the side surface of the first half-mold in an oblique sealing manner, and the internal injection axis of the double-inclined mixing nozzle 5 is inclined to the axis of the injection channel inside the PU injection mold cavity. The sides of the first half-mold and the third half-mold are respectively provided with installation inclined surfaces, and the lateral sealing structure includes a mounting plate 15 and a sealing member 16, the mounting plate is fixed on the installation inclined surface 73 of the third half-mold and faces the third half-mold. The inner plane of the cavity of the half-mold extends from one side, the mounting plate 15 and the inner plane of the cavity of the third half-mold 7 form a side inclination angle α of 95° to 120°, and the seal 16 is sleeved on the double-inclined mixing nozzle 5 The upper and lower parts are respectively matched with the double inclined mixing nozzle 5 and the mounting plate 15. The mounting inclined surface 43 of the first half mold is provided with a butt sealing groove 42, and the butt sealing groove 42 is in sealing cooperation with the mounting plate. In this embodiment, the sealing member 16 is a Teflon ring, which is used to realize the sealing between the double-inclined mixing nozzle and the mounting plate, as well as the sealing between the PU injection mold cavity. The sealing member 16 is over-fitted with the mounting plate 15, the mounting plate 15 is fixedly mounted on the third half-mold 7 by screws, the contact surface of the mounting plate 15 and the third half-mold 7 is closely fitted, and the plane of inner plane of the mold cavity of the half-mold 7 forms a side inclination angle α of 95°~120°. The nozzles, seals and mounting plates of the double-inclined mixing nozzle 5 are transition fit, and the fit tolerance is H6/m5. leakage during injection. The double-inclined mixing nozzle is directly fixed on the side of the third half-mold, and the unique lateral sealing structure 60 can be used skillfully to use the mold clamping action of the injection machine to lock the sealing structure and reduce the double-inclined mixing. The reverse thrust caused by the high pressure of the nozzle during the injection phase reduces the influence of the reverse thrust to a very low level, and the influence of the jet instability caused by the reverse thrust is also reduced accordingly, so that the fluid can fill the cavity 25 more smoothly, allowing the jet to flow. The state of the product is maintained within a relatively stable range, thereby further improving the quality stability and consistency of the product. The lateral sealing structure 60 comprises a mounting plate 15 and a sealing member 16, the mounting plate 15 is fixed on the mounting inclined plane and extends to one side of the mold cavity plane of the third half mold, the mounting plate 15 forms a side inclined included angle of 95°~120° with the mold cavity plane of the third half mold 89, and the seal is sleeved on the double inclined mixing nozzle and transiently matched with the double inclined mixing nozzle and the mounting plate 15 respectively.

Figure 5:
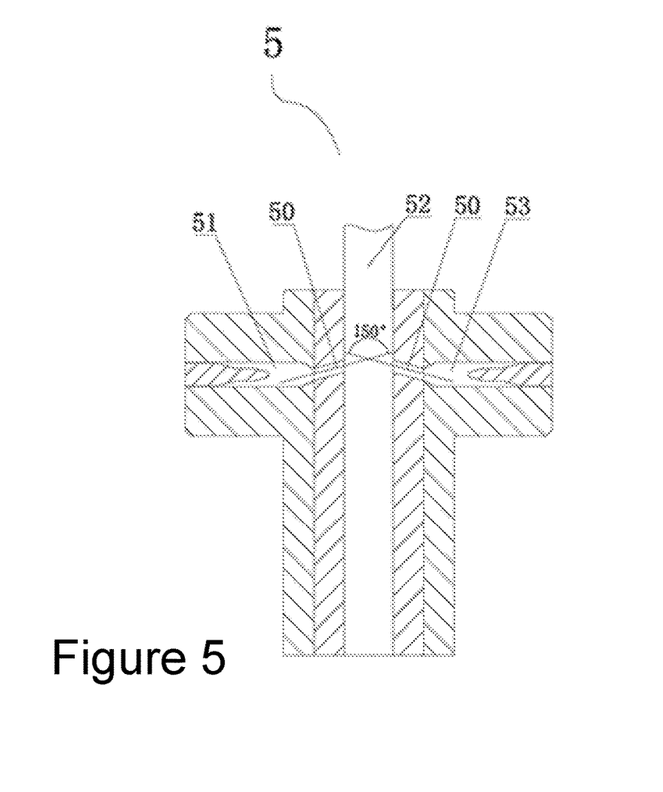
FIG. 5 is a schematic diagram of the internal structure of the double-inclined mixing nozzle in the present invention.
Figure 6:
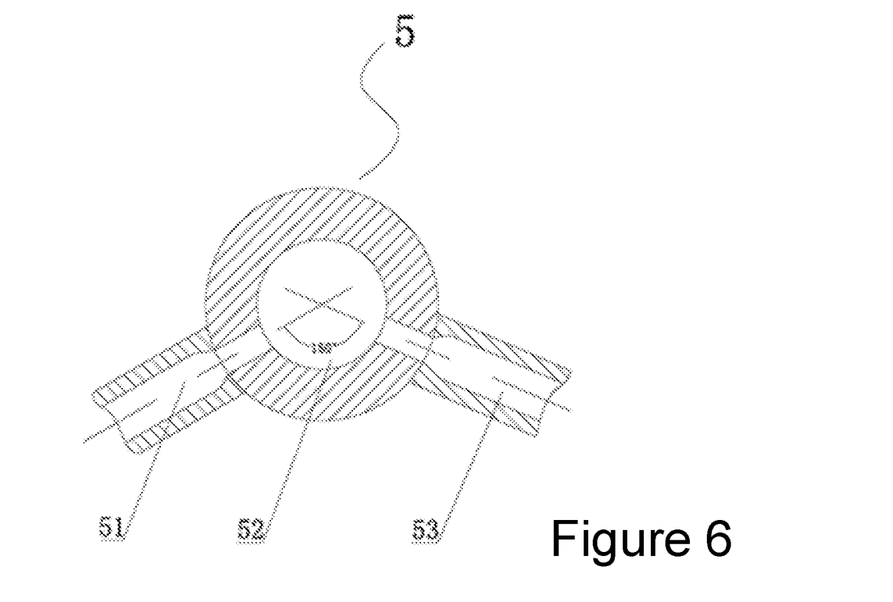
FIG. 6 is another angle structure schematic diagram of double-inclined mixing nozzle in the present invention.
Figure 11:
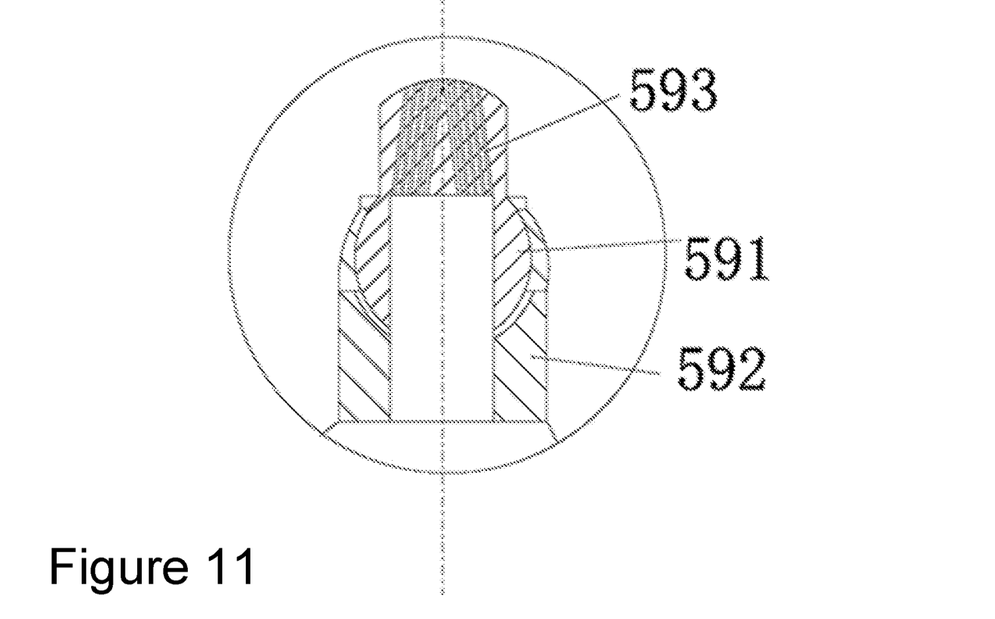
FIG. 11 is a structural representation of nozzle in the present invention.

As shown in FIGS. 5 and 6, the injection inclination angle β between the internal injection axis of the double-inclined mixing nozzle 5 and the axis of the injection channel inside the PU injection mold cavity is set to 5°~30°; A mixing flow channel 52 and a component flow channel are arranged inside the mixing nozzle 5, and the component flow channel is of a staggered axis collision structure and communicated with the mixing flow channel 52. The component flow channel includes a first component flow channel 51 and a second component flow channel 53, and the first component flow channel 51 and the second component flow channel 53 are in a staggered axis collision structure. They form an independent circulation system with the inside of the PU injection device 8 respectively; the injection axis of the double-inclined mixing nozzle 5 and the inner plane of the third half-mold 7 for clamping the mold to form the PU injection mold cavity are arranged at an angle. A nozzle 59 is provided on the double-inclined mixing nozzle 5. The injection angle β is formed between the injection axis of the nozzle 59 and the inner plane of the third half-mold used for clamping to form the PU injection mold cavity, and the nozzle is a variable-angle vortex collision nozzle. That is to say, the direction of injection and the PU injection mold cavity are set in an inclined structure, which effectively reduces the reverse thrust during injection, so as to stabilize the jet injected by the PU, so that the fluid can fill the cavity 25 more smoothly, so that the state of the jet is maintained at a relative within a stable range, thereby improving the quality stability and consistency of the product. In order to further maintain the jet stability of the fluid, a new design of the nozzle is carried out. As shown in FIG. 11, in this embodiment, the nozzle is designed as a variable-angle nozzle that can change the angle with the fluid spray. At the same time, the interior is arranged in a vortex collision structure. The specific structure is that the nozzle includes a rotating head 591 and a connecting body 592, the rotating head and the connecting body are sealed and matched through a spherical rotating structure, and the spherical rotating structure includes a rotating ball groove set on the connecting body and a rotating ball head set on the rotating head. The rotating head is provided with a vortex collision type structure. The vortex collision type structure is specifically arranged in the nozzle of the rotary head as a plurality of independent nozzle holes 593 arranged in a collision type structure. The spray axes of the individual spray holes intersect the axis of the rotary head. At this time, the injection axis of the nozzle is the axis of the rotating head, not the injection axis of the independent injection hole, that is, during installation, the axis of the rotating head and the third half-mold 7 are used for clamping to form the inner part of the PU injection mold cavity. The angle between the planes forms the jetting angle β. The jet axis of the independent jet hole intersects with the axis of the rotating head and collides there, so that the mixing rate of the fluid can be maintained and improved continuously, and the fluid after docking enters the cavity in a relatively stable jet state. At the same time, the rotating head rotates automatically under the action of the fluid injection pressure. At this time, the angle β between the axis of the rotating head and the inner plane of the third half-mold 7 used for clamping to form the PU injection mold cavity is the same as the rotation. The rotation head is constantly changing from 5° to 30°, so that the jet fluid not only rotates in the rotating head, but also jets, so that the fluid is mixed more uniformly and fully, and the stability of the product quality can be further improved. Moreover, the nozzle can also be replaced according to different spraying requirements to meet the requirements of different spraying purposes of various products.

Figure 3:
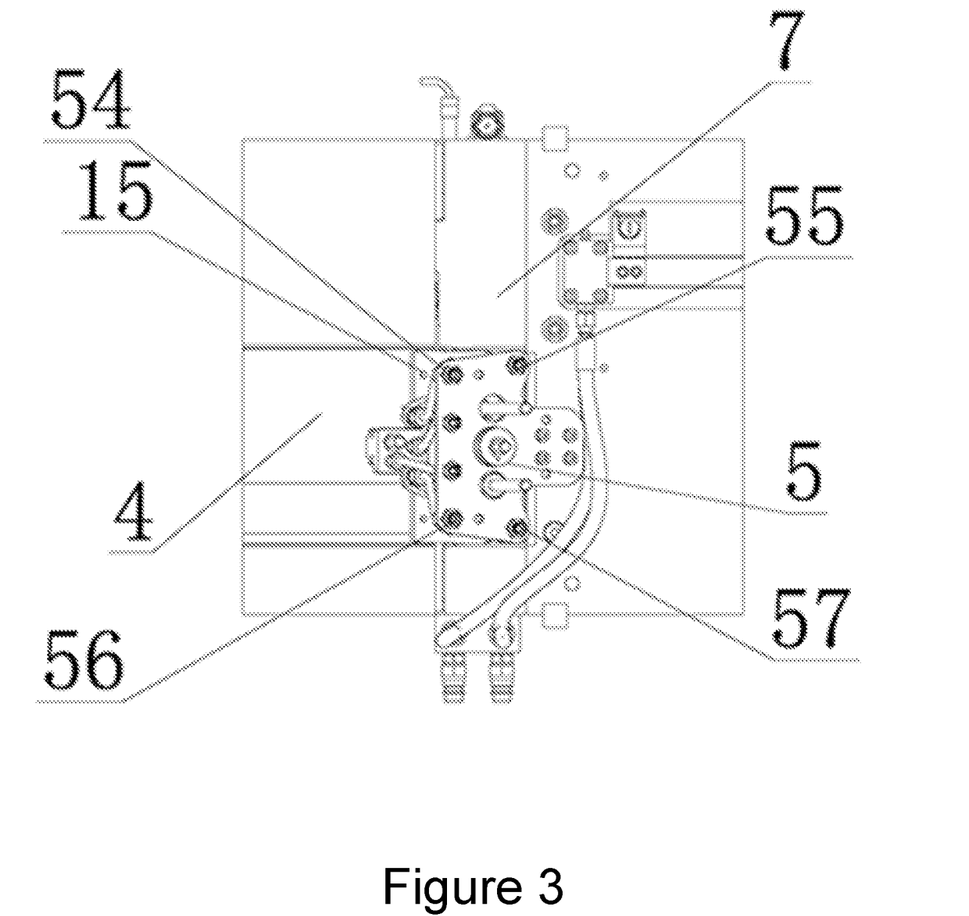
FIG. 3 is a first-view structural schematic diagram of the connection between the double-inclined mixing nozzle and the third half-mold in the present invention.

As shown in FIG. 3, the dual-inclined mixing nozzle 5 is respectively provided with a first component flow channel 51, a mixing flow channel 52, a second component flow channel 53, a first component outlet 54, and a first component inlet 55, the second component outlet 56, the second component inlet 57, the raw material piston 58, when the PU injection is not performed, the raw material piston 58 blocks the component flow channel. The first component flow channel 51 and the second component flow channel 53 are respectively provided with a raw material piston 58, and the double-inclined mixing nozzle 5 is provided with a first group that communicates with the first component flow channel 51 and forms an independent circulation system. The component inlet 55 and the first component outlet 54, the first component inlet 55 and the first component outlet 54 are respectively connected to the first component PU injection device; 53 communicates with and forms the second component inlet 57 and the second component outlet 56 of the independent circulation system. The second component inlet 57 and the second component outlet 56 are respectively connected to the second component PU injection device. In this embodiment, the second component is taken as an example. The second component enters the second component flow channel 53 from the second component inlet 57 and flows back to the PU injection device from the second component outlet 56 to form an independent cycle. When the raw material piston 58 is opened. At this time, the raw materials of the two components are injected into the mixing channel 52 to start the mixing reaction.

The internal structure of the double-inclined mixing nozzle 5 is a 120°~150° staggered axis collision structure. The middle is set as a mixing flow channel, and the two sides are component flow channels. The component flow channels are arranged opposite each other and not on the same axis. In this embodiment, the axes of the two-component flow passages intersect at 150°, so that the separation value of the two-component liquids is set to be the smallest, which effectively reduces the occurrence of string material. After the impact, the mixed components of the two will generate a second impact on the arc wall cavity again, and at the same time, the vortex will be dispersed, which is beneficial to maximize the mixing effect.

The component flow channel includes a first component flow channel 51 and a second component flow channel 53, and the first component flow channel 51 and the second component flow channel 53 are respectively provided with injection chambers 50, the axis of the injection cavity of the first component flow channel and the axis of the injection cavity of the second component flow channel are arranged at a cross of 120°~150°, and the intersection of the axes of the two injection chambers is set on the axis of the mixing channel 52 to form a staggered axis collision structure.

Figure 2:
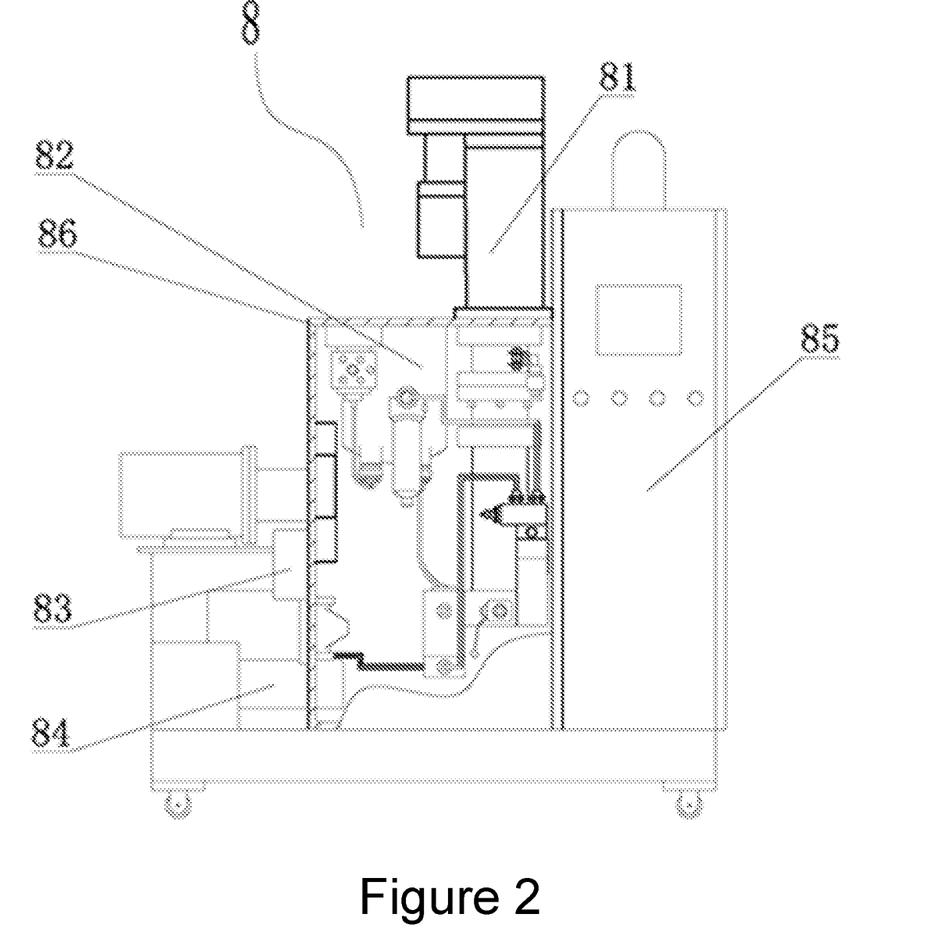
FIG. 2 is a structural representation of PU injection device in the present invention.

As shown in FIG. 2, the PU injection device 8 includes a first component PU injection device and a second component PU injection device, and the first component PU injection device and the second component PU injection device respectively include a pressure pump 81, a material tank 82, flow meter 83, hot air blower 84, electric control cabinet 85 and insulation box 86, the material tank 82 is detachably arranged above the interior of the insulation box 86, the pressure pump 81 is arranged inside the insulation box 86 and communicated with the material tank 82 through a pipeline, and the flow meter 83 is arranged on one side of the insulation box 86 and passes through the pipe The road is connected to the material tank 82, and the hot air blower 84 is arranged under one side outside the thermal insulation box 86, and circulates hot air continuously into the thermal insulation box 86. The electric control cabinet 85 is arranged on one side of the thermal insulation box 86 to control the pressure of the pressure pump 81 and the flow rate of the flow meter 83. A PU injection device is set up for different components of raw materials, and the PU injection device of each component includes a pressure pump, a material tank, a flow meter, a hot air blower, an electric control cabinet and a thermal insulation box. The material tank can be mechanically disassembled. The method is arranged above the interior of the thermal insulation box, and the material tank can be disassembled and replaced. There is no need to add additional tanks for color change injection. Air-cooled heating is used to control the temperature of PU raw materials, eliminating the need for water circulation system and corresponding pipe network and water pump, which is more environmentally friendly and saves water resources, reliable operation, convenient use and maintenance, maintenance costs are extremely low.

In this embodiment, the PU injection device 8 inputs the raw materials of different components (polyol (POLY) and isocyanate (ISO)) into the double-inclined mixing nozzle 5 through the pressure pump 81. When the double-inclined mixing nozzle is not opened In the state, POLY and ISO respectively form independent loops in the pipeline and do not interfere with each other; After the double-inclined mixing nozzle is turned on, the PU raw material is mixed in the double-inclined mixing nozzle and injected into the PU injection mold cavity in a low-viscosity state to solidify to form a surface coating.

The raw materials of the two components enter the double-inclined mixing nozzle 5 from different pipelines respectively, form an independent flow path circulation inside, and return to the material tank of the PU injection device from different pipelines respectively. The electric control cabinets 8-5 of the PU injection device 8 individually set the parameters of each component raw material entering the double-inclined mixing nozzle, including flow rate, temperature, injection time, and injection pressure.

The specific implementation process of the in-mold spraying system: the hopper 1 is fed with ordinary PC material or ABS plastic, and the raw material is plasticized and stored through the injection part 2. For the first mold clamping, the first half mold 4 fixed on the front template 3 is first closed with the second half mold 6 to form a raw material injection mold cavity. When the mold is opened for the first time, the base material 24 is fixed on the first mold half 4, the second mold half 6 retreats with the front mold plate 3, and the mold cylinder 18 moves at the same time, which drives the mold mounting plate 23 to move, and the second mold half 6 moves away from the first mold half 6. The first half mold 4 and the third half mold 7 move to the position of the second half mold 6 when the mold is closed for the first time; The second mold clamping, the first half mold 4 and the third half mold 7 are closed to form a PU injection mold cavity, the exhaust neutron 71 on the third mold half is opened, and the base material 24 is located inside the PU injection mold cavity at this time. The PU injection device 8 injects two kinds of raw materials, POLY and ISO, into the double-inclined mixing nozzle according to the preset flow rate and pressure. The two raw materials are mixed in the double inclined mixing nozzle to form PU material, and under the pressure of the pressure pump 81, while mixing the two raw materials of POLY and ISO, they are injected into the PU injection mold cavity through the PU flow channel 72, on the base material. A PU layer is formed, and after pressure-holding and cooling, the mold is opened for the second time to obtain a plastic product with a PU layer.

The in-mold spraying system forms two mold cavities through three half-molds, injects in two times, and injects the substrate into the substrate injection mold cavity to form the substrate, and can form a PU coating with high surface quality in the PU injection mold cavity There is no need to place the injection-molded products in another set of equipment for surface spraying processing, and two working steps can be realized in one station, which improves the production efficiency. The pressure of the PU injection device is used to provide the injection pressure of the PU material, and there is no need to add an additional low-pressure part, which saves the cost of the equipment and reduces the impact of the complexity of the equipment on the quality of the product. A double inclined mixing nozzle is installed on the side of the third half mold, and the spray axis of the double inclined mixing nozzle is arranged at an angle with the inner plane of the third half mold for clamping to form the PU injection mold cavity. This design structure can skillfully use the mold clamping action of the injection machine to realize the locking of the lateral sealing structure, which effectively reduces the influence of the jet instability phenomenon caused by the high-pressure reverse thrust of the double-inclined mixing nozzle during the injection stage. The fluid can fill the cavity more smoothly to maintain the state of the jet in a relatively stable range, thereby further improving the quality stability and consistency of the product. This in-mold spraying system has a new design for the double-inclined mixing nozzle. The mixing flow channel is set inside the double-inclined mixing nozzle, as well as the component flow channel that communicates with the mixing flow channel. The component flow channels collide with different axes. Structural setting, the middle is set as a mixing flow channel, and the two sides are component flow channels. In this way, the liquid separation value of the two components inside the component flow channels on both sides is minimized, which can effectively reduce the occurrence of material stringing. A second impact on the chamber also dissipates a vortex, helping to maximize mixing. The two-component raw materials inside the two-component flow channel enter the double-inclined mixing nozzle from different pipelines, forming an independent flow path circulation inside, and return to the PU injection device from different pipelines, independently. The circulation system makes it possible to not mix with each other before spraying, and to circulate independently, avoiding the occurrence of the phenomenon of bunching.

Figure 12:
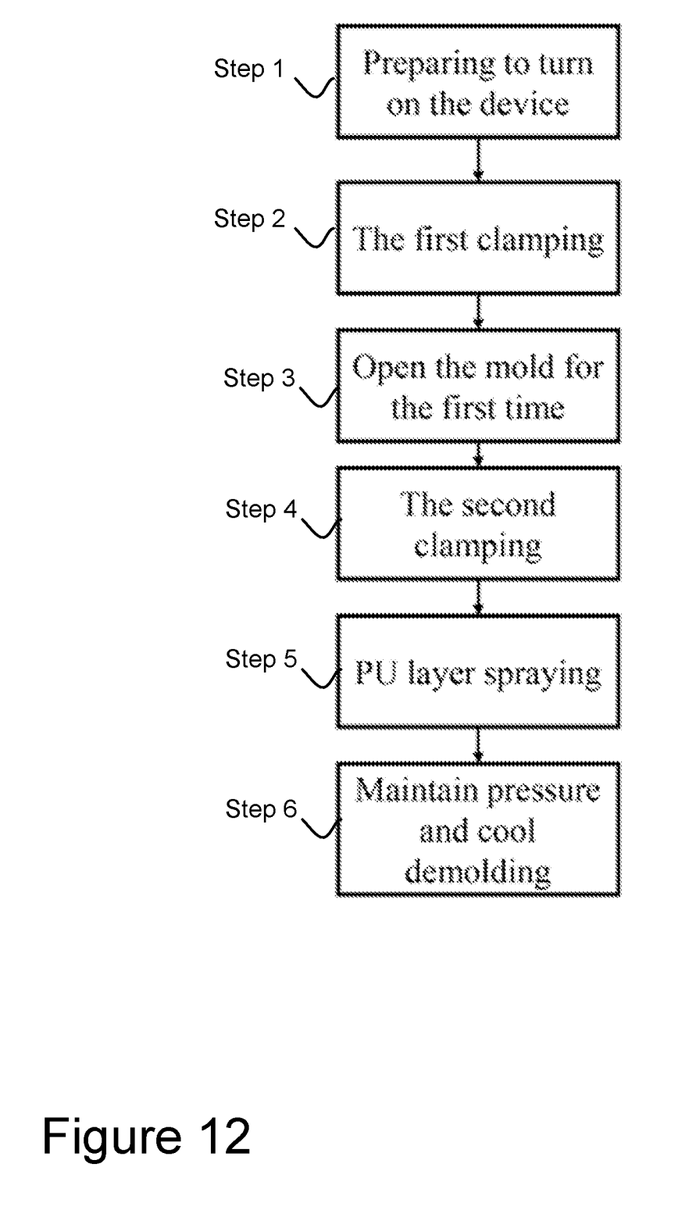
FIG. 12 is the block diagram of spraying process method among the present invention.

In the present embodiment, as shown in FIG. 12, the process method for spraying with an in-mold spraying system includes the following steps:

Step 1: Preparation for equipment startup: the injection machine and the PU injection device 8 are turned on, the mold temperature control unit 9 heats the first half-mold 4, the second half-mold 6 and the third half-mold 7 to 60° C.~85° C., The PU injection device 8 heats the raw material in the material tank 82 to 60-85° C., at the same time, each component of the PU material starts to circulate independently in the component flow channels in the double-inclined mixing nozzle 5;

Step 2: The first mold clamping: the first half-mold 4 and the second half-mold 6 are closed to form a base material injection mold cavity, the injection machine injects PC or ABS into the injection mold cavity of the base material, and the injection molding is kept under pressure and cooled to obtain the base material 24;

Step 3: The first mold opening: the first mold half 4 and the second mold half 6 are opened, the base material 24 is fixed on the first mold half 4, and the mold cylinder 18 starts to work, move the second half-mold 6 away from the first half-mold 4, and the third half-mold 7 move closer to the first half-mold 4 to reach the corresponding position of clamping with the first half-mold 4;

Step 4: The second mold clamping: the first half mold 4 and the third half mold 7 are closed to form a PU injection mold cavity, the clamping mechanism provides a clamping force of 1500 kN-2500 kN, the double-inclined mixing nozzle 5 fixing the side of the third half-mold 7 is tightly fitted with the side of the first half-mold (4) to complete the sealing, and open the exhaust neutron 71 inside the third mold half 7;

Step 5: PU layer spraying: After the exhaust neutron 71 is turned on for at least 5 seconds, the flow channels of all components are turned on, the PU raw material enters the mixing flow channel 52 from the component flow channel, is mixed in the mixing flow channel 52, and is injected into the PU injection mold cavity under the pressure of the PU injection device 8 and formed a PU layer on the substrate 24.

Step 6: Pressure-maintaining cooling and demolding: pressure-maintaining and cooling for 70-90 seconds, the ejector pin 41 of the first half-mold 4 pushes the workpiece with the PU coating out of the mold to obtain a plastic product with a PU layer.

This process method uses three half-molds to form two mold cavities, and is injected in two times to form PU coated products with high surface quality. Two steps are realized in one station, and the production efficiency is high, and the pressure of the PU injection device is high. The pump directly provides the injection force of the PU material, which saves the cost of the equipment and reduces the impact of the complicated procedure of the equipment on the quality of the product. Since the double-inclined mixing nozzle is arranged on the side of the third half-mold and is provided with a lateral sealing structure, the clamping action of the injection machine can be used to realize the locking of the sealing structure and reduce the occurrence of jet instability caused by reverse thrust. The fluid can fill the cavity more smoothly to maintain the state of the jet in a relatively stable range, improve the quality stability and continuity of the product, and effectively control the mold temperature. After the PU material enters the mold cavity, it will not react quickly and fix the surface quality of the PU layer is improved, and the process method is easy to operate and reliable in operation.

It should be noted that the foregoing describes embodiments of the present invention. However, those skilled in the art should understand that the present invention is not limited by the above-mentioned embodiments. What is described in the above embodiments is only to illustrate the principle of the present invention, without departing from the scope of the present invention, the present invention will have various changes and improvements, and these changes and improvements all fall within the scope of the claimed invention. Based on the embodiments described in the present invention, all other embodiments obtained by those of ordinary skill in the art on the basis of the technical solutions of the present application without creative work shall fall within the protection scope of the present invention.

We claim:

1. The in-mold spraying system comprising:
   a double-inclined mixing nozzle connected obliquely and fixedly with a side surface of a third half-mold through a lateral sealing structure, and connected with a side surface of a first half-mold in an inclined and sealing manner, side surfaces of the first half-mold and the third half-mold are respectively provided with installation inclined surfaces;
   the lateral sealing structure comprising a mounting plate and a sealing member, the mounting plate is fixed on an installation inclined surface of the third half-mold and extends on one side of an inner plane of a mold cavity of the third half-mold, the mounting plate and the inner plane of the mold cavity of the third half-mold form a side inclined angle of 95°~120°, the sealing member is sleeved on the double-inclined mixing nozzle and is in transition fit with the double-inclined mixing nozzle and the mounting plate respectively; and
   a butt sealing groove provided on the installation inclined surface of the first half-mold, the butt sealing groove is in sealing fit with the mounting plate.

2. The in-mold spray coating system of claim 1, wherein an injection inclination angle between an internal injection axis of the double-inclined mixing nozzle and an axis of an injection flow channel inside a PU injection mold cavity is set to 5°~30°, a nozzle is provided on the double-inclined mixing nozzle, an angle of injection inclination is formed between an injection axis of the nozzle and the inner plane of the third half-mold used for clamping to form the PU injection mold cavity.

3. The in-mold spraying system according to claim 1, wherein a mixing flow channel and a component flow channel are arranged inside the double-inclined mixing nozzle, the component flow channel is connected with the mixing flow channel, and each component flow channel forms an independent circulation system with an inside of a PU injection device respectively; the component flow channel includes a first component flow channel and a second component flow channel, the first component flow channel and the second component flow channel are respectively provided with injection chambers, axes of the injection chambers of the first component flow channel and the second component flow channel are arranged to intersect at 120°-150°, and an intersection of the axes of the two injection chambers is arranged on the axis of the mixing flow channel to form a staggered axis collision structure.

4. The in-mold spraying system according to claim 3, wherein the first component flow channel and the second component flow channel are respectively provided with raw material pistons, the double-inclined mixing nozzle is provided with a first component inlet and a first component outlet that communicate with the first component flow channel and form the independent circulation system, the first component inlet and the first component outlet are respectively connected to the PU injection device, the double-inclined mixing nozzle is provided with a second component inlet and a second component outlet that communicate with the second component flow channel and form independent circulation system, the second component inlet and the second component outlet are respectively connected to the PU injection device.

5. The in-mold spraying system according to claim 4, wherein the PU injection device includes a first component PU injection device and a second component PU injection device, the first component PU injection device and the second component PU injection device respectively comprise a pressure pump, a material tank, a flow meter, an air blower, an electric control cabinet and a thermal insulation box, the material tank is arranged above an interior of the thermal insulation box, the pressure pump is arranged inside the thermal insulation box and communicated with the material tank through a pipeline, the flow meter is arranged on one side of the thermal insulation box and is connected to the material tank through a pipeline, the air blower is arranged outside the thermal insulation box, and continuously circulates air into the thermal insulation box, the electric control cabinet is arranged on a side of the thermal insulation box to control a pressure of the pressure pump and set a flow rate of the flow meter.

6. The in-mold spraying system according to claim 1, wherein a thimble is arranged on the first half-mold, the third half-mold is provided with a PU flow channel and an exhaust, a mold temperature control unit controls a mold temperature of the first half-mold, a second half-mold and the third half-mold to be 60° C.~85° C.

7. The in-mold spraying system according to claim 1, wherein a fixed plate is arranged on a moving template, a bottom of the fixed plate is provided with a sliding groove, a sliding guide is arranged inside the sliding groove, a guide rail is fixedly installed on a mold mounting plate, a second half-mold and the third half-mold are fixed on the mold mounting plate, a mold cylinder is provided on the fixed plate, a moving plate is connected to a piston rod of the mold cylinder, the moving plate is fixedly connected with the mold mounting plate and drives the mold mounting plate to slide along the sliding groove.

\* \* \* \* \*